US008619975B2

(12) United States Patent
Yamamoto et al.

(10) Patent No.: US 8,619,975 B2
(45) Date of Patent: Dec. 31, 2013

(54) CIPHER PROCESSING APPARATUS

(75) Inventors: Dai Yamamoto, Kawasaki (JP); Kouichi Itoh, Kawasaki (JP); Jun Yajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1024 days.

(21) Appl. No.: 12/656,018

(22) Filed: Jan. 13, 2010

(65) Prior Publication Data

US 2010/0183144 A1 Jul. 22, 2010

(30) Foreign Application Priority Data

Jan. 16, 2009 (JP) .................................... 2009-7250

(51) Int. Cl.
*H04L 29/06* (2006.01)
*G06F 21/00* (2013.01)

(52) U.S. Cl.
USPC ................. 380/28; 380/37; 380/259; 380/44

(58) Field of Classification Search
USPC ........................................................ 380/28
See application file for complete search history.

(56) References Cited

U.S. PATENT DOCUMENTS

| 7,212,631 | B2 * | 5/2007 | Averbuj et al. | 380/37 |
|---|---|---|---|---|
| 2004/0131180 | A1 * | 7/2004 | Mazuz et al. | 380/37 |
| 2005/0047592 | A1 * | 3/2005 | Lim | 380/28 |

FOREIGN PATENT DOCUMENTS

WO 02/098052 12/2002

OTHER PUBLICATIONS

Yamamoto, A Very Compact Hardware Implementation of the Kasumi Block Cipher, International Federation for Information Processing, 2010, 293-307.*
Dai Yamamoto et al., "A Very Compact Hardware Implementation of the MISTY1 Block Cipher," Cryptographic Hardware and Embedded Systems ÂCHES 2008, LNCS 5154, Aug. 10, 2008, pp. 315-330.
Akashi Satoh et al., "Small and High-Speed Hardware Architectures for the 3GPP Standard Cipher KASUMI," Information Security, ISC 2002, LNCS 2433, Sep. 30, 2002, pp. 48-62.
The Extended European Search Report for the corresponding European Application No. 10 15 0760, mailed on Apr. 7, 2010.
"Specification of the 3GPP Confidentiality and Integrity Algorithms; Document 2: KASUMI Specification" (http://www.3gpp.org/ftp/Specs/archive/35_series/35.202/35202-700.zip ), Dec. 1, 1999, pp. 1-24.

* cited by examiner

*Primary Examiner* — Edan Orgad
*Assistant Examiner* — Brian Olion
(74) *Attorney, Agent, or Firm* — Staas & Halsey LLP

(57) ABSTRACT

A cipher processing apparatus for arithmetic operations of an FO function and an FL function comprising: an FL function operating unit for generating a 2N-bit output based on a first extension key; a partial function operating unit for generating an N-bit output based on second and third extension keys; an N-bit intermediate register for storing an output of the partial operating unit; a 2N-bit first data register for storing data based on the output of the FL function operating unit; and a controller for making the partial function operating unit perform six cycles, inputting an output of the intermediate register to the FL function operating unit, and storing the data based on the output of the FL function operating unit in the first data register, in a first case in which the FL function uses a result of an arithmetic operation of the FO function.

19 Claims, 21 Drawing Sheets

FIG.13

| 1, 2 cycle | $(L_H \| L_L) = (L_H \| L_L) \oplus (R_L \| R_L)$<br>$FIreg = FI(R_L, KO_{i,2}, KI_{i,2})$ |
| --- | --- |
| 3, 4 cycle | $(L_H \| L_L) = (L_H \| L_L) \oplus (FIreg \| FIreg)$<br>$FIreg = FI(R_H, KO_{i,1}, KI_{i,1})$ |
| 5, 6 cycle | $(L_H \| L_L) = (L_H \| L_L) \oplus (FIreg \| FIreg)$<br>$FIreg = FI(FIreg \oplus R_L, KO_{i,3}, KI_{i,3})$ |
| 7 cycle | $(L_H \| L_L) = (L_H \| L_L) \oplus (0 \| FIreg)$ |

FIG.16

Cycle1
$$FIreg <= FI'_{i,2}(FL_L(L_H \| L_L), KO_{i,2}, KI_{i,2})$$

Cycle2
$$FIsig = FI_{i,2}(FL_L(L_H \| L_L), KO_{i,2}, KI_{i,2})$$
$$\{R_H \| R_L\} <= \{R_H \| R_L\} \oplus \{FIsig \| FIsig\}$$

Cycle3
$$FIreg <= FI'_{i,1}(FL_H(L_H \| L_L), KO_{i,1}, KI_{i,1})$$

Cycle4
$$FIsig = FI_{i,1}(FL_H(L_H \| L_L), KO_{i,1}, KI_{i,1}) \oplus FL_L(L_H \| L_L)$$
$$FIreg <= FIsig$$
$$\{R_H \| R_L\} <= \{R_H \| R_L\} \oplus \{FIsig \| FIsig\}$$

Cycle5
$$FIreg <= FI'_{i,3}(FIreg, KO_{i,3}, KI_{i,3})$$

Cycle6
$$FIsig = FI_{i,3}(FIreg, KO_{i,3}, KI_{i,3})$$
$$\{R_H \| R_L\} <= \{R_H \| R_L\} \oplus \{0 \| FIsig\}$$

FIG. 17

Cycle1
$$FIreg <= FI'_{i,2}(R_L, KO_{i,2}, KI_{i,2})$$

Cycle2
$$FIreg <= FI_{i,2}(R_L, KO_{i,2}, KI_{i,2})$$

Cycle3
$$\{L_H \| L_L\} <= \{L_H \| L_L\} \oplus FL(\{FIreg \| FIreg\})$$
$$FIreg <= FI'_{i,1}(R_H, KO_{i,1}, KI_{i,1})$$

Cycle4
$$FIreg <= FI_{i,1}(R_H, KO_{i,1}, KI_{i,1}) \oplus R_L$$

Cycle5
$$\{L_H \| L_L\} <= \{L_H \| L_L\} \oplus FL(\{FIreg \| FIreg\})$$
$$FIreg <= FI'_{i,3}(FIreg, KO_{i,3}, KI_{i,3})$$

Cycle6
$$FIreg <= FI_{i,3}(FIreg, KO_{i,3}, KI_{i,3})$$

Cycle7
$$\{L_H \| L_L\} <= \{L_H \| L_L\} \oplus FL(\{0 \| FIreg\})$$

FIG.19

Cycle1
$$FIreg \Leftarrow FI'_{i,2}(R_L, KO_{i,2}, KI_{i,2})$$

Cycle2
$$FIreg \Leftarrow FI_{i,2}(R_L, KO_{i,2}, KI_{i,2})$$

Cycle3
$$\{L_H \| L_L\} \Leftarrow \{L_H \| L_L\} \oplus FL(\{FIreg \| FIreg\})$$
$$FIreg \Leftarrow FI'_{i,1}(R_H, KO_{i,1}, KI_{i,1})$$

Cycle4
$$\{L_H \| L_L\} \Leftarrow \{L_H \| L_L\} \oplus \{(KL_{i,2} <<< 1) \| 0\}$$
$$FIreg \Leftarrow FI_{i,1}(R_H, KO_{i,1}, KI_{i,1})$$

Cycle5
$$\{L_H \| L_L\} \Leftarrow \{L_H \| L_L\} \oplus FL(\{FIreg \| FIreg\})$$
$$FIreg \Leftarrow FI'_{i,3}((FIreg \oplus R_L), KO_{i,3}, KI_{i,3})$$

Cycle6
$$\{L_H \| L_L\} \Leftarrow \{L_H \| L_L\} \oplus FL(\{R_L \| R_L\})$$
$$FIreg \Leftarrow FI_{i,3}((FIreg \oplus R_L), KO_{i,3}, KI_{i,3})$$

Cycle7
$$\{L_H \| L_L\} \Leftarrow \{L_H \| L_L\} \oplus FL(\{0 \| FIreg\})$$

FIG.21

| | SIZE OF INTERMEDIATE REGISTER | CIRCUIT SIZE |
|---|---|---|
| PRIOR ART | 48-BIT | 648 gate |
| EMBODIMENT | 16-BIT | 216 gate |

CIPHER PROCESSING APPARATUS

CROSS-REFERENCE TO RELATED APPLICATIONS

This application is related to and claims priority to application Japanese Patent Application No. 2009-7250 filed on Jan. 16, 2009 and incorporated herein by reference.

FIELD

The embodiments discussed herein are directed to a cipher processing apparatus.

BACKGROUND

Various cipher algorithms are used as a fundamental technique of a security system. The cipher algorithm may be divided into a public key cryptosystem and a common key cryptosystem. In the public key cryptosystem, different keys are used for encryption and decryption. In the public key cryptosystem, a encryption key, i.e. a public key is made public. In the public cryptosystem, a decryption key, i.e. a private key forms confidential information accessible only by the receiving party. On the other hand, in the common key cryptosystem, the same key, i.e. a common key is used for encryption and decryption. In the common key cryptosystem, safety is established by keeping the common key accessible only by a transmitting party and a receiving party and confidential to third parties.

The cipher algorithm of the common key cryptosystem, as compared with the cipher algorithm for the public key cryptosystem, has the advantage that its processing speed is higher and a more compact implementation is possible. Therefore, the cipher algorithm of the common key cryptosystem is widely used in small devices such as mobile phones and IC cards. Also, due to the high processing speed and the fact that information can be encrypted/decrypted in real time, the cipher algorithm of the common key cryptosystem is adopted also for information communication in a broadcasting field and a communication field.

The cipher algorithm of the common key cryptosystem is roughly divided into stream cipher and block cipher. The block cipher may be used for the common key cryptosystem to establish safety. In the block cipher, a plane text (text to be ciphered) is divided into segments (called the blocks) of fixed bit length, and then ciphered block by block. Note that a bit length of a block as a processing unit of ciphering is called a "block length".

Various algorithms are known for the block cipher of the common key cryptosystem. Representative cipher algorithms include DES, AES, SC2000, MISTY (MISTY1, MISTY2), KASUMI and CAMELLIA. These cipher algorithms of the common key cryptosystem may be implemented as either hardware or software.

KASUMI is known as one of the algorithms of the block cipher. KASUMI is described in "Specification of the 3GPP Confidentiality and integrity Algorithms; Document 2: KASUMI Specification" (http://www.3gpp.org/ftp/Specs/archive/35_series/35.202/35202-700.zip). KASUMI is an algorithm having the private key of 128 bits and the block length of 64 bits. Specifically, KASUMI can generate a cipher text of 64 bits using the private key of 128 bits from a plane text of 64 bits. A round processing unit of KASUMI is described below.

FIG. 1 illustrates an example of the round processing unit for the encryption process of KASUMI. The round processing unit of KASUMI has a Feistel structure having a FO function and a FL function. KASUMI has the Feistel structure of 8 rounds. In the encryption process of KASUMI, a plane text P of 64 bits is input and a cipher text C of 64 bits is output. KLi, KOi, and KIi shown in FIG. 1 are extension keys generated from the private key of 128 bits. Each function is described in detail below.

FIG. 2 illustrates an example of the FOi function, where $1 \leq i \leq 8$. A 32-bit input to the FOi function is divided into two data of 16 bits. The divided data are converted by exclusive disjunction and the FI function. KOij ($1 \leq j \leq 3$) and KIij ($1 \leq j \leq 3$) are the j-th 16-bit data from the left of the extension keys KOi and KIi, respectively.

FIG. 3 illustrates an example of the FIij function, where $1 \leq i \leq 8$ and $1 \leq j \leq 3$. A 16-bit input to the FIij function is divided into data of 9 bits on the left and data of 7 bits on the right. The divided data are converted by exclusive disjunction and two nonlinear functions S9 and S7. In FIG. 3, the term "zero-extended" indicates the conversion of the 7-bit data into the 9-bit data by adding zeros to its high-order two bits. The term "truncated" indicates the conversion of the 9-bit data into the 7-bit data by discarding its high-order two bits. The 7-bit data on the left of the extension key KIij is indicated as KIij1, and the 9-bit data on the right are indicated as KIij2.

FIG. 4 illustrates an example of the FLi function, where $1 \leq i \leq 8$. A 32-bit input to the FLi function is divided into two data of 16 bits. The divided data are converted by the exclusive disjunction, AND gate and OR gate. KLij ($1 \leq i \leq 8$, $1 \leq j = 2$) indicates the j-th 16-bit data from the left of the extension key KLi.

The conventional compact implementation of the round processing unit of KASUMI is disclosed below.

FIGS. 5A and 5B illustrate an example of the compact implementation of the known technique FI function. FIG. 5A shows an example of a circuit that realizes the FO function. FIG. 5B shows an example of a circuit that realizes the FI function. Conventionally, the FI function may be realized with two cycles. In the circuit shown in FIG. 5B, an FI ½ module constituting only the upper half of the FI function may be implemented. In the circuit shown in FIG. 5B, the intermediate result of the first cycle is stored in a 16-bit register. Also, in the circuit shown in FIG. 5B, the intermediate result stored in the 16-bit register is input to an FI ½ module in the second cycle. As a result, the circuit shown in FIG. 5B realizes the FI function with two cycles in total.

The FI function executes the nonlinear conversion of 7 bits to 7 bits as S7 and the nonlinear conversion of 9 bits to 9 bits as S9. The FI function is known to include a part comparatively large in circuit size. The use of the FI ½ module leads to the advantage that the circuit size is reduced more than that in the case of implementing an entire FI function as it is.

Also, the FO function may be implemented on the basis of one FI function. As described above, the FO function has three FI functions. In the circuit shown in FIG. 5A, on the other hand, only one stage of the FI function may be implemented for the FO function. In the circuit shown in FIG. 5A, the bit width of the FO function is 32 bits, and therefore, the intermediate result is stored in a 32-bit register. In the circuit shown in FIG. 5A, the process is repeated in the next cycle with the intermediate result stored in the 32-bit register as an input. Thus, the circuit shown in FIG. 5A realizes the FO function.

The execution of the process in a plurality of cycles as described above eliminates the need of implementing plural FI functions. As a result, the circuit size of the round processing unit of KASUMI is advantageously reduced. Here, one stage of the FI function is processed with two cycles using the FI ½ module as described above. In other words, since the FI function is executed with two cycles, 6 cycles (=2 cycles×3 stages) is required to execute the FO function.

Conventionally, an example of the compact implement of the round processing unit of KASUMI requires 16 bits as an intermediate register for the FI function. Further, the known example requires 32 bits as an intermediate register for the FO function. In the known example, therefore, a total of 48 bits is required for the intermediate register. In following descriptions, the intermediate register for the FI function is referred to as FIreg and the intermediate register for the FO function as FOreg.

FIG. 6 illustrates an example of the round processing unit of the known technique KASUMI. In FIG. 6, RH, RL, LH and LL designate data registers for storing in-process results of the cipher text. When each of these registers has 16 bits, the size of the data registers is 64 bits in total.

The round processing unit shown in FIG. 6 includes a controller 31, a FL function 12, a FI ½ module 13, data registers 14a and 14b, intermediate registers 35a and 35b, XOR gates 36a and 36b, and selectors 37b, 37c, 37f, 37g, 37h, 37i and 37j. The data register 14a has 32 bits. The high-order 16 bits of the data register 14a correspond to RH, and the low-order 16 bits thereof to RL. The data register 14b has 32 bits. The high-order 16 bits of the data register 14b correspond to LH, and the low-order 16 bits thereof to LL. The intermediate register 35a has 16 bits and corresponds to FIreg, while the intermediate register 35b has 32 bits and corresponds to FOreg. The controller 31 controls the selectors 37b, 37c, 37f, 37g, 37h, 37i and 37j.

SUMMARY

According to an aspect of the present invention, there is provided a cipher processing apparatus for arithmetic operations of an FO function and an FL function in a cipher process, comprising: an FL function operating unit for generating a 2N-bit output by an arithmetic operation of the FL function based on a 2N-bit input and a first extension key; a partial function operating unit for generating an N-bit output by an arithmetic operation of a partial function of an FI function based on an N-bit input and second and third extension keys; an N-bit intermediate register for storing an output of the partial operating unit; a 2N-bit first data register for storing data based on the output of the FL function operating unit; and a controller for making the partial function operating unit perform six cycles of the arithmetic operation of the partial function, inputting an output of the intermediate register to the FL function operating unit, and storing the data based on the output of the FL function operating unit in the first data register, in a first case in which the FL function uses a result of an arithmetic operation of the FO function.

Additional objects and advantages of the invention will be set forth in part in the description which follows, and in part will be obvious from the description, or may be learned by practice of the invention. The object and advantageous of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 13 illustrates a processing algorithm in a case where the FO function register is lacking and the FI function register has 16 bits on the assumption that the FL function is absent just under the FO function;

FIG. 16 illustrates a processing algorithm for an odd-numbered round in a round processing unit according to a first embodiment;

FIG. 17 illustrates the processing algorithm for an even-numbered round in the round processing unit according to a first exemplary embodiment;

FIG. 19 illustrates a processing algorithm for an even-numbered round in the round processing unit according to a second embodiment;

FIG. 21 illustrates the size of the intermediate register and the circuit size of the round processing unit.

DESCRIPTION OF EMBODIMENTS

Conventionally, a round processing unit requires the intermediate registers having 48 bits in total. Generally, a circuit size of the register is large as compared with other devices. For a compact circuit, therefore, the requirement of a register as large as 48 bits may cause a problem of an increased circuit size.

An exemplary embodiment addresses this problem. An exemplary embodiment eliminates the need of an intermediate register for storing a result of an arithmetic operation of the FO function in calculating the FO function and the FL function.

According to an exemplary embodiment, a size of an intermediate register in compact implementation of the round processing unit of KASUMI is reduced to 16 bits. A 16-bit intermediate register for the FO function and a 16-bit intermediate register for the FI function may be integrated into a common register. As a result, the round processing unit of KASUMI may be implemented with one 16-bit intermediate register as a whole configuration.

For this configuration, however, a problem described below is addressed.

In KASUMI, the FL function is not linear. Its 16-bit intermediate register, therefore, makes it impossible to maintain logical equivalence in even-numbered rounds of the round processing unit of KASUMI, i.e. in a portion with a structure of FO function to FL function. A conventional 48-bit intermediate register doesn't cause such problem, but the 16-bit intermediate register causes a problem as explained below.

Figure 1:
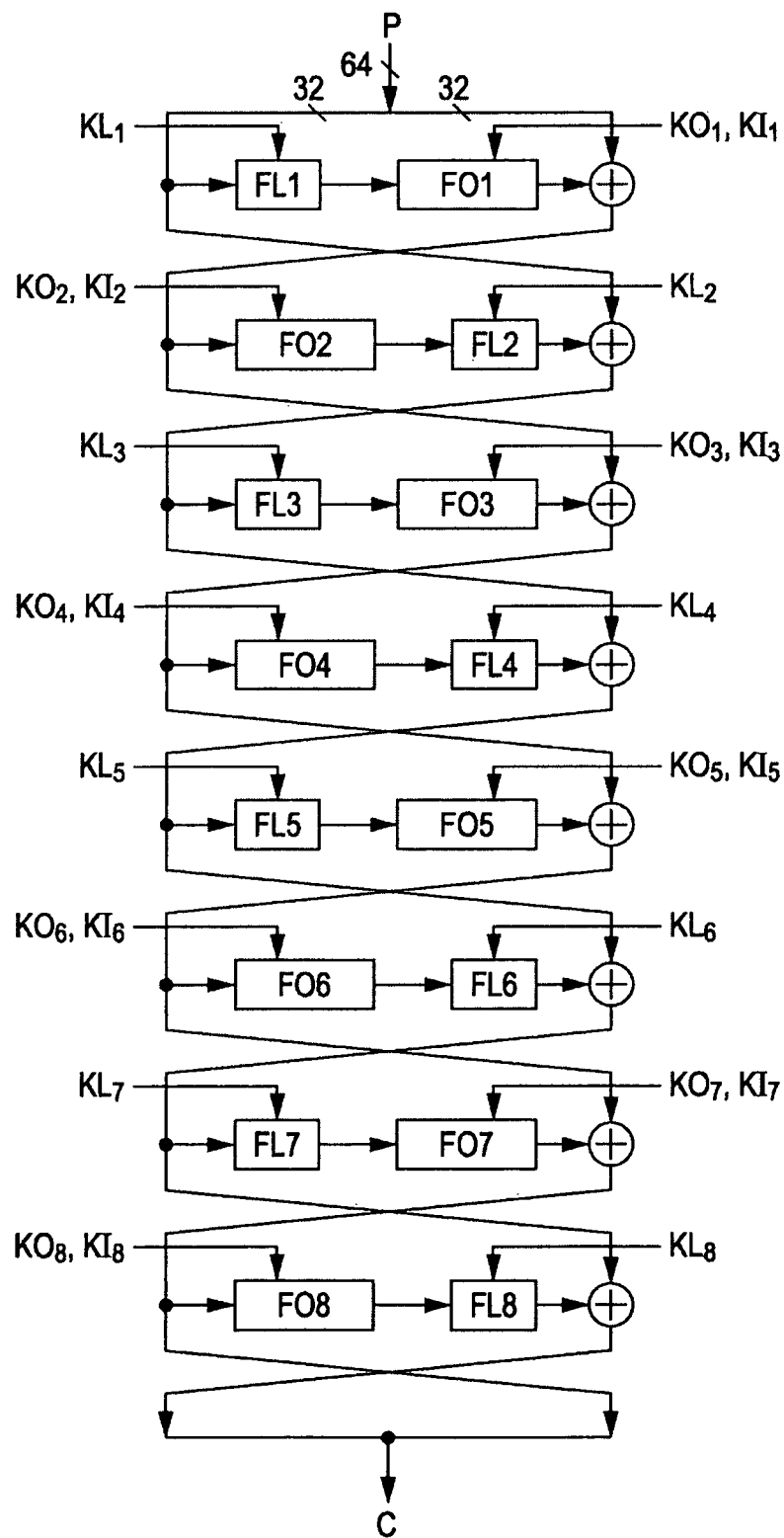
FIG. 1 illustrates a round processing unit for the ciphering process of KASUMI.
Figure 2:
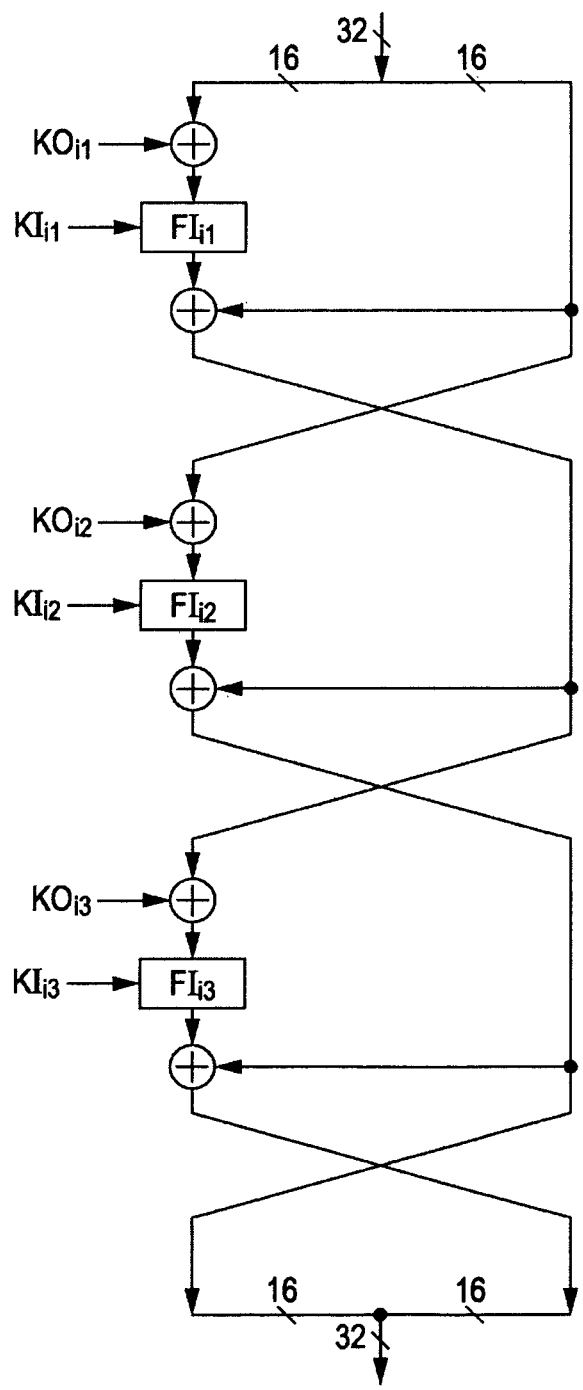
FIG. 2 illustrates an example of an FOi function.
Figure 3:
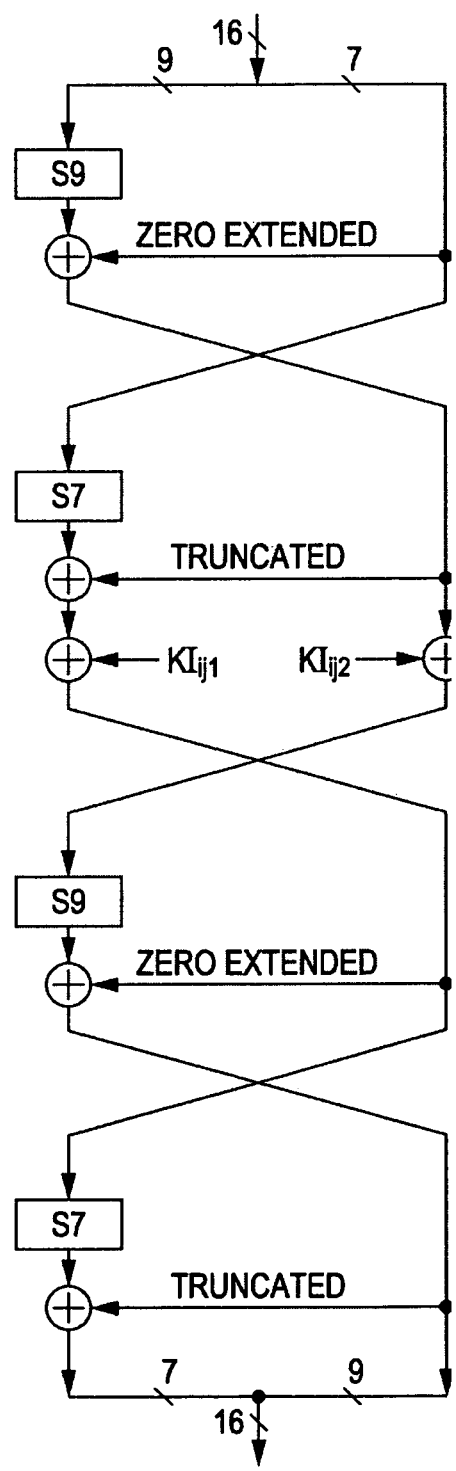
FIG. 3 illustrates an example of an FIij function.
Figure 4:
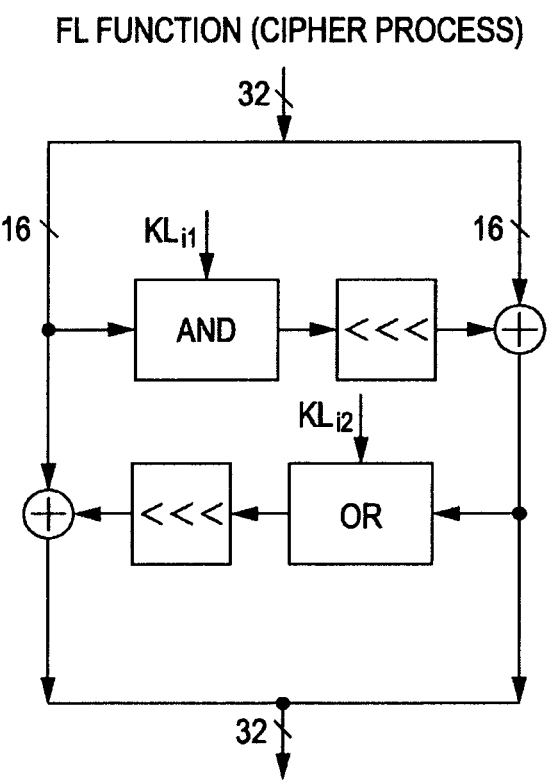
FIG. 4 illustrates an example of an FLi function.
Figure 5A:
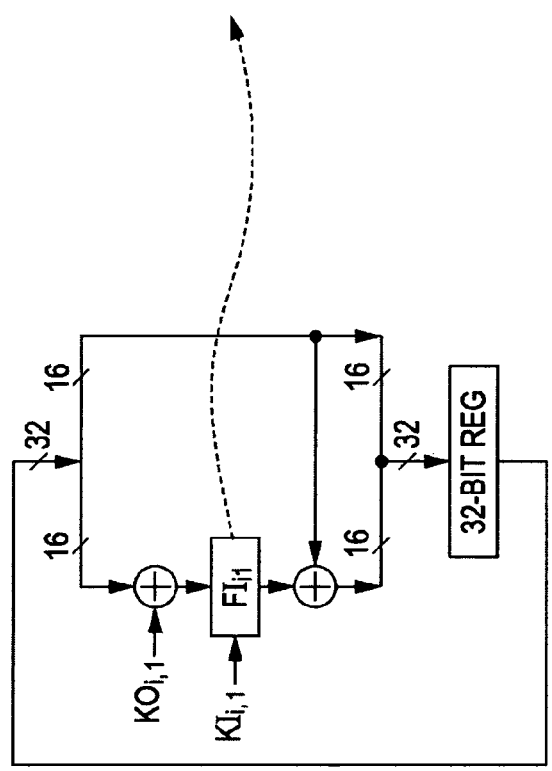
FIG. 5A is a circuit diagram showing an example of a conventional compact implement of the FO function.
Figure 5B:
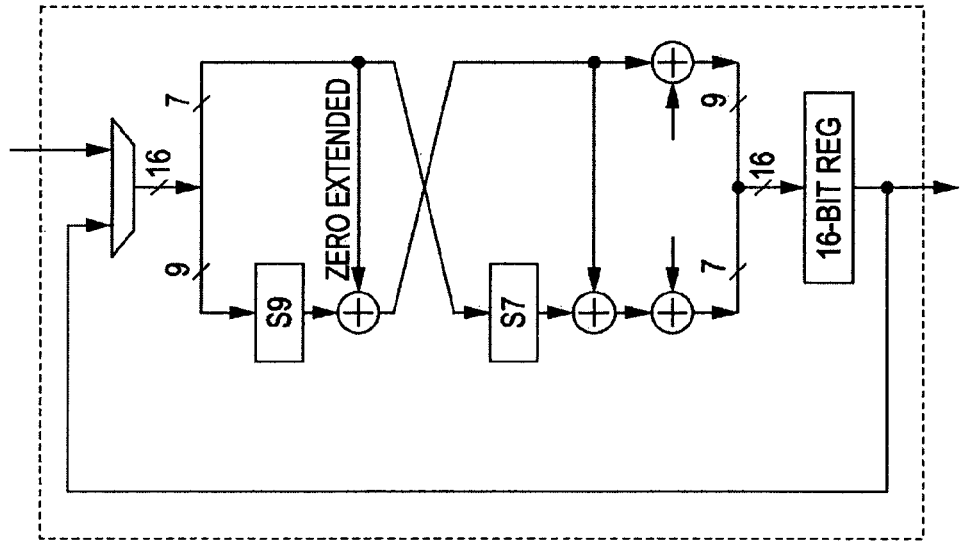
FIG. 5B illustrates an example of a conventional compact implement of the FI function.
Figure 6:
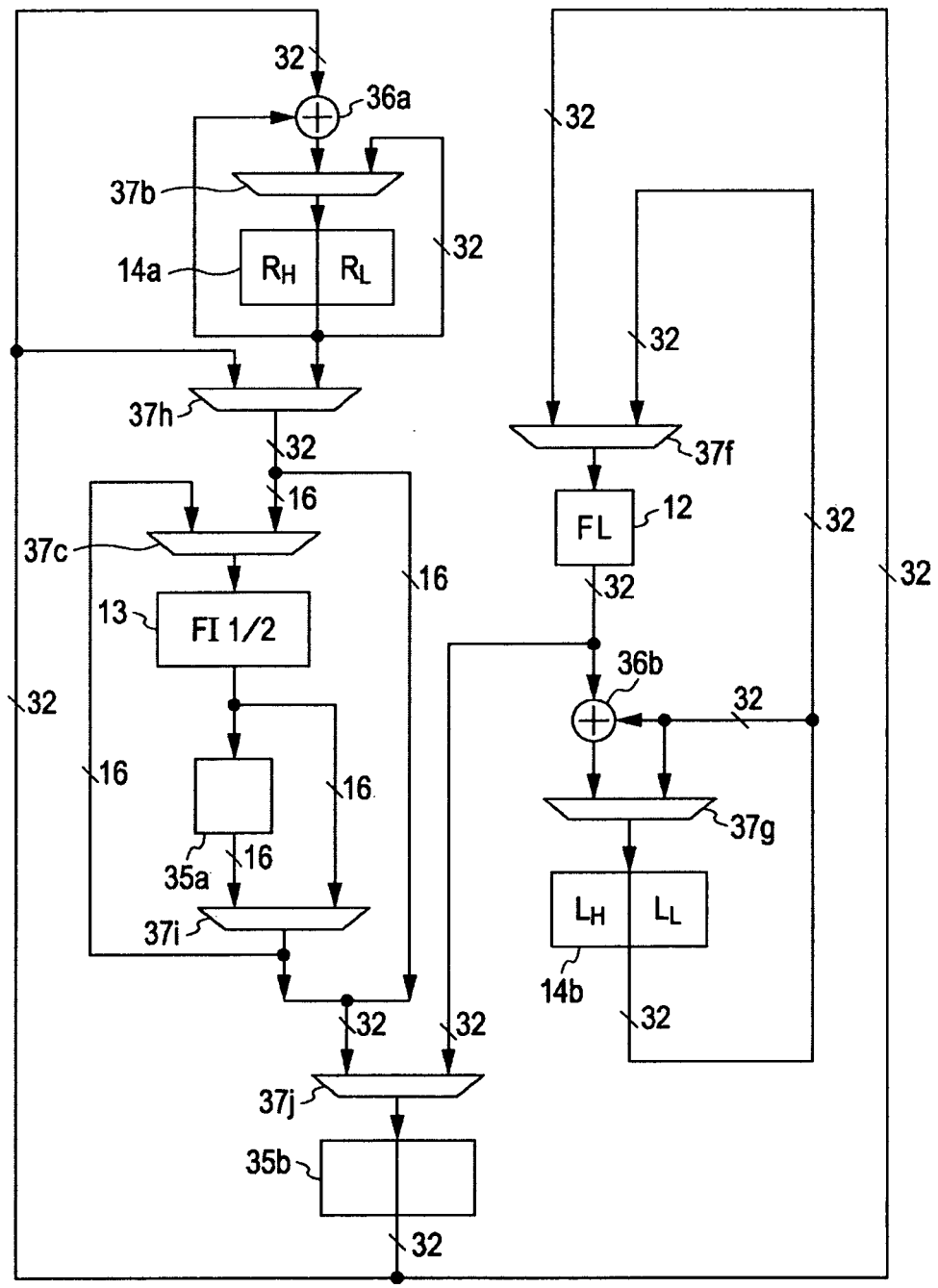
FIG. 6 illustrates an example of a conventional round processing unit of KASUMI.
Figure 7:
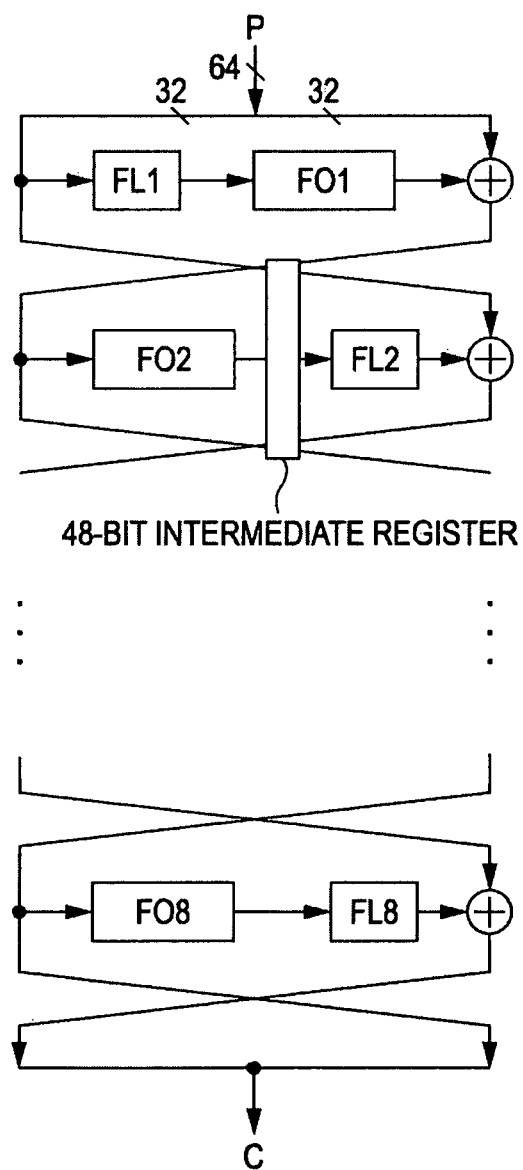
FIG. 7 illustrates a process executed by a round processing unit with an intermediate register having 48 bits in size.

FIG. 7 illustrates the process executed by the round processing unit including a 48-bit intermediate register. As described above, conventionally, for the compact implementation of the round processing unit of KASUMI realizes the FO function with six cycles. The circuit shown in FIG. 7 holds the intermediate result in the 48-bit intermediate register. Also, in the circuit of FIG. 7, the data stored in the intermediate register are collectively input to the FL function after the six cycles. Therefore, no problem is caused by the circuit of FIG. 7 in which only one data passes through the FL function.

Figure 8:
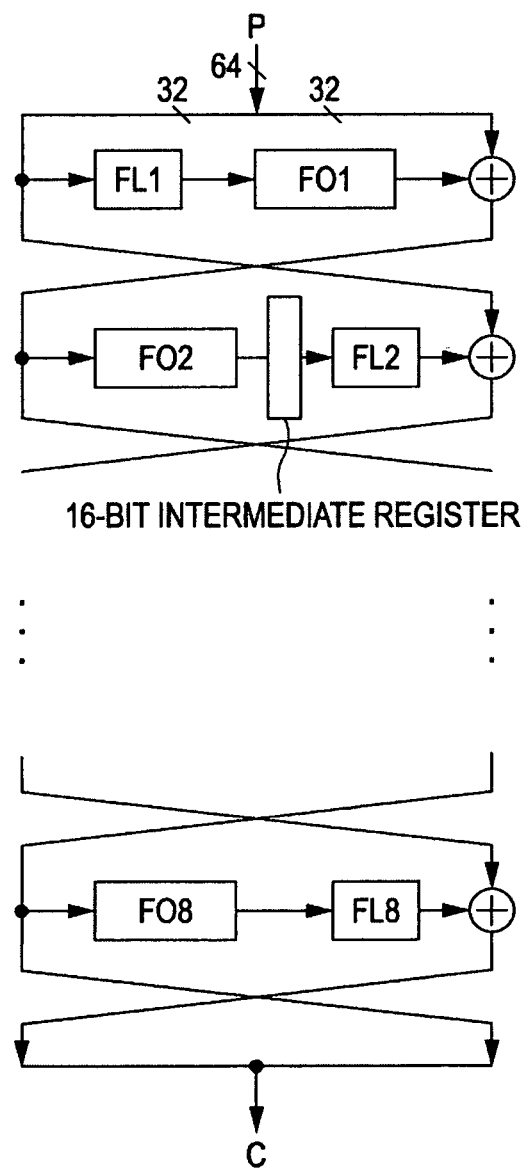
FIG. 8 illustrates a process executed by the round processing unit with an intermediate register having 16 bits in size.

FIG. 8 illustrates the process executed by the round processing unit having a 16-bit intermediate register. In the circuit shown in FIG. 8, all results of arithmetic operations processed by the FL function with six cycles are not stored in the intermediate register. Instead, in the circuit shown in FIG. 8, some of the operation results are directly input to the FL function. The output from the FO function is input to the FL function in the same cycle. Unlike in the case where the 48-bit intermediate register is employed; in which the output of the FO function is collectively input to the FL function at once, the output of the FO function is input (sequentially) in a plurality of times to the FL function in the case where the 16-bit intermediate register is involved.

The FL function in KASUMI is not linear. Therefore, a problem is caused that an equation (E-1) below is not valid by the FL function in KASUMI.

$$FL(\alpha \oplus \beta) = FL(\alpha) \oplus FL(\beta) \quad \text{(E-1)}$$

Due to lack of linearity in the FL function, the problem remains unsolved that the logical equivalence cannot be held in the case where the 16-bit intermediate register is employed as shown in FIG. 8.

An arithmetic operation of the FO-FL function will be disclosed.

Figure 9:
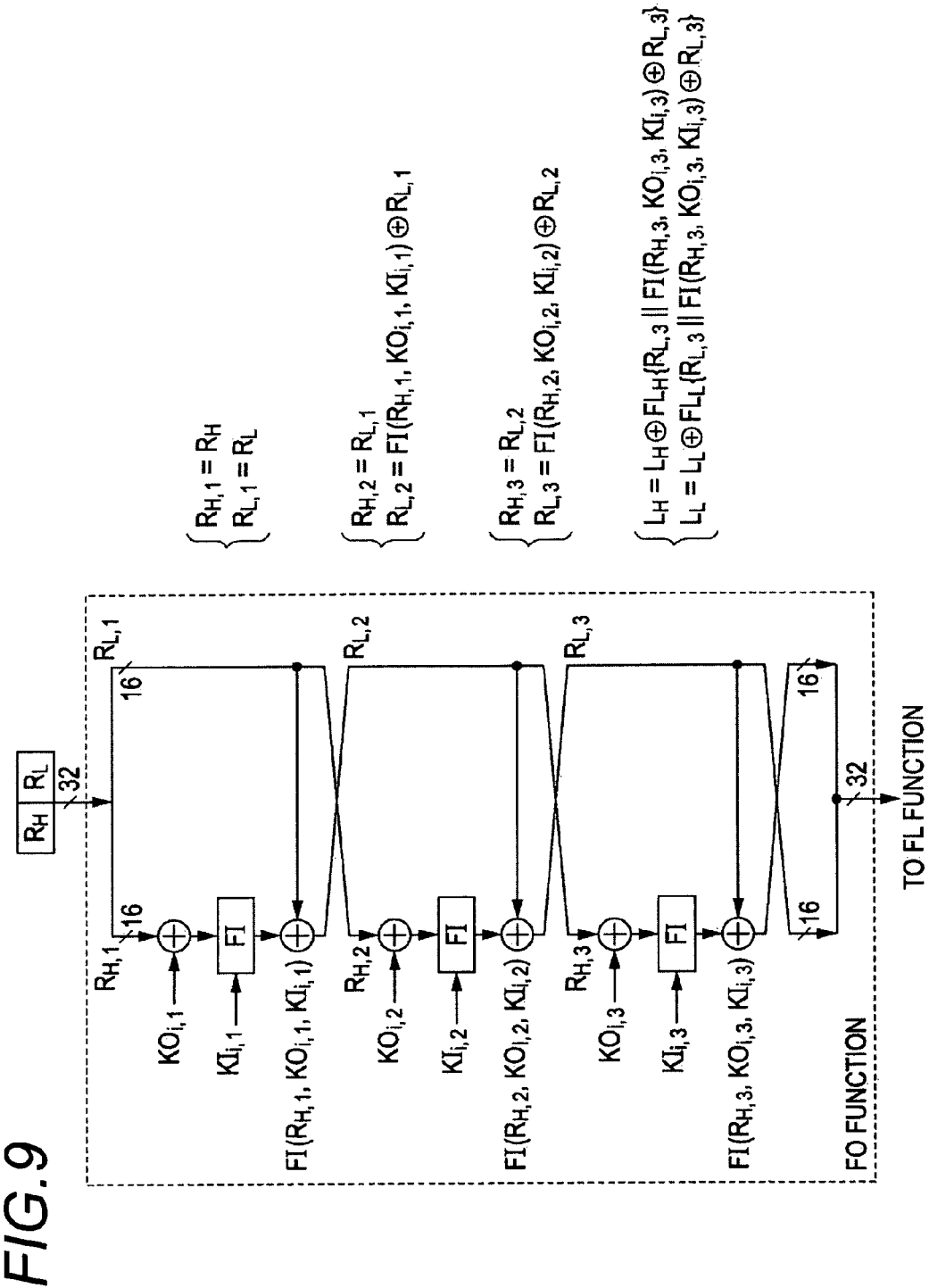
FIG. 9 illustrates an arithmetic-logic content of the FO function in the FO-FL function.
Figure 10:
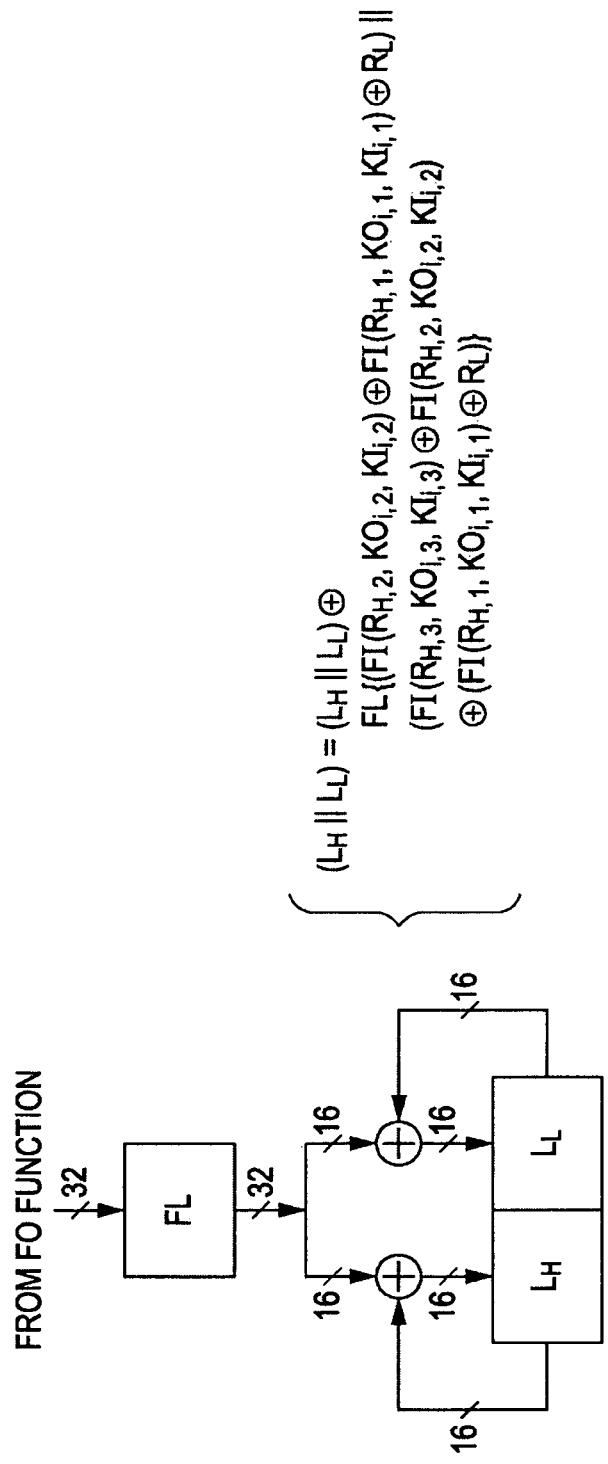
FIG. 10 illustrates an arithmetic-logic content of the FL function in the FO-FL function.

FIG. 9 illustrates an arithmetic-logic content of the FO function in the FO-FL function. FIG. 10 illustrates an arithmetic-logic content of the FL function in the FO-FL function. These figures illustrate the contents of the logical arithmetic operation in the rounds of the FL function process executed after the FO function process.

The circuit shown in FIG. 9 is supplied with a 32-bit data register RH∥RL to execute the FO function process, where RH and RL each has 16 bits. Here, an operator "X∥Y" indicates a combination of X as a high-order bit string and Y as a low-order bit string. The circuit shown in FIG. 10 executes the FL function process based on the result of arithmetic operation of the FO function. The circuit shown in FIG. 10 also performs XOR operations based on the operation result of the FL function and other 32-bit data registers LH and LL, where LH and LL each has 16 bits. The data input to the first, second and third stages of the FO function are designated as (RH,1∥RL,1), (RH,2∥RL,2) and (RH,3∥RL,3), respectively, where RH,1, RL,1, RH,2, RL,2, RH,3 and RL,3 each has 16 bits. The result of arithmetic operation on LH and LL with relation to RH and RL is obtained by an equation (A-1) below.

$$(L_H \| L_L) := (L_H \| L_L) \oplus FL(FI(R_{H,2}, KO_{i,2}, KI_{i,2}) \oplus FI(R_{H,1}, KO_{i,1}, KI_{i,1}) \oplus R_L \| FI(R_{H,3}, KO_{i,3}, KI_{i,3}) \oplus FI(R_{H,2}, KO_{i,2}, KI_{i,2}) \oplus FI(R_{H,1}, KO_{i,1}, KI_{i,1}) \oplus R_L) \quad \text{(A-1)}$$

With regard to the implement of the aforementioned arithmetic operation of the FO-FL function, an explanation is given below when the FO function register has 32 bits and the FI function register has 16 bits.

Figure 11:
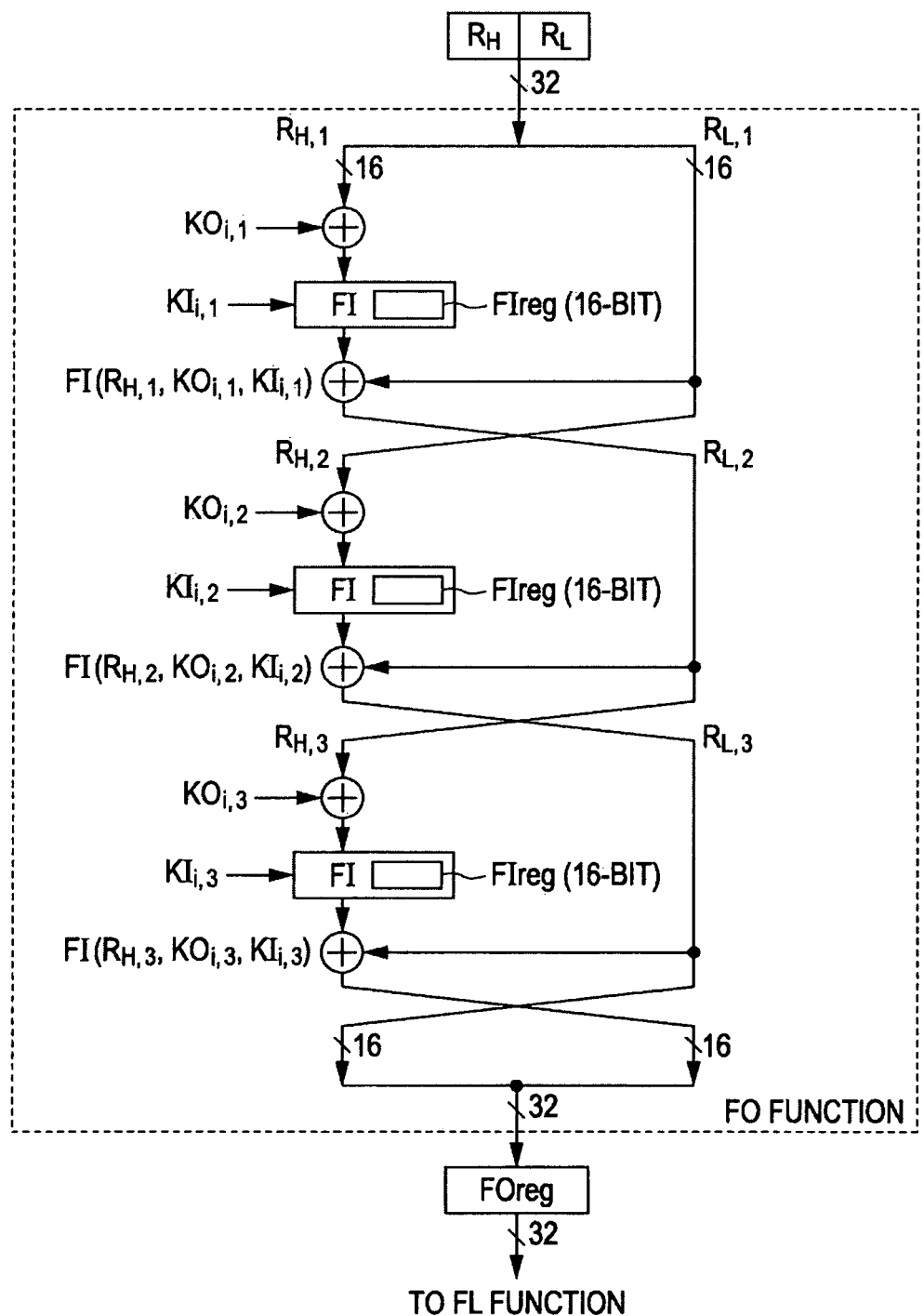
FIG. 11 illustrates the FO function in the FO-FL function in a case where a register for the FO function has 32 bits and a register for the FI function has 16 bits.
Figure 12:
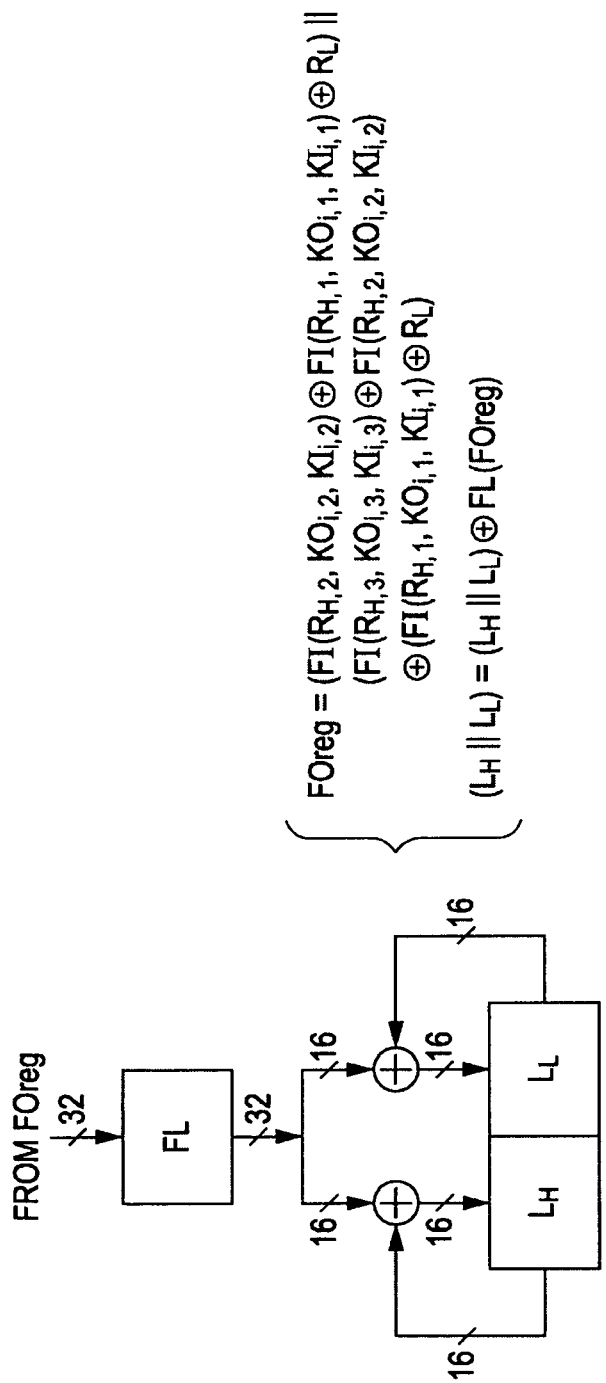
FIG. 12 illustrates the FL function in the FO-FL function in the case where the register for the FO function has 32 bits and the register for the FI function has 16 bits.

FIG. 11 illustrates the FO function in the FO-FL function in the case where the register for the FO function has 32 bits and the register for the FI function is 16 bits. FIG. 12 illustrates the FL function in the FO-FL function in the case where the register for the FO function has 32 bits and the register for the FI function is 16 bits. In the circuit shown in FIG. 11, the arithmetic operation indicated by the equation (A-1) may be implemented with FOreg that is a 32-bit register for the FO function and FIreg that is a 16-bit register for the FI function. First, the circuit shown in FIG. 11 buffers the value of 32 bits input to the FL function in FOreg. The circuit shown in FIG. 12 executes the FL function process by using the 32-bit value of the FOreg, so that the operation result and the data registers LH and LL are subjected to the XORing process. The result of the arithmetic operation of the FOreg by the circuit shown in FIG. 11 is given by an equation (A-2) below.

$$FOreg = FI(R_{H,2}, KO_{i,2}, KI_{i,2}) \oplus FI(R_{H,1}, KO_{i,1}, KI_{i,1}) \oplus R_L \| FI(R_{H,3}, KO_{i,3}, KI_{i,3}) \oplus FI(R_{H,2}, KO_{i,2}, KI_{i,2}) \oplus FI(R_{H,1}, KO_{i,1}, KI_{i,1}) \oplus R_L \quad \text{(A-2)}$$

The result of arithmetic operation of LH and LL by the circuit shown in FIG. 12 is obtained by an equation (A-3) below.

$$(L_H \| L_L) := (L_H \| L_L) \oplus FL(FOreg) \quad \text{(A-3)}$$

In implementing the arithmetic operation of the FO-FL function described above, a case will be explained below in which FOreg is lacking and FIreg has 16 bits.

In the case where FOreg is lacking and FIreg has 16 bits, the arithmetic operation different from the one shown in the equation (A-1) is performed. Due to the lack of FOreg, an 32-bit value of an equation (A-4) below to be input to the FL function may be partially calculated while being subjected to the XORing process with LH and LL.

$$FI(R_{H,2}, KO_{i,2}, KO_{i,2}) \oplus FI(R_{H,1}, KO_{i,1}, KI_{i,1}) \oplus R_L \| FI(R_{H,3}, KO_{i,3}, KI_{i,3}) \oplus FI(R_{H,2}, KO_{i,2}, KI_{i,2}) \oplus FI(R_{H,1}, KO_{i,1}, KI_{i,1}) \oplus R_L \quad \text{(A-4)}$$

Here, assume that the FL function process is lacking after the FO function process. In such a case, the arithmetic-logic content is shown by an equation (A-5) below.

$$(L_H \| L_L) := (L_H \| L_L) \oplus (FI(R_{H,2}, KO_{i,2}, KI_{i,2}) \oplus FI(R_{H,1}, KO_{i,1}, KI_{i,1}) \oplus R_L \| FI(R_{H,3}, KO_{i,3}, KI_{i,3}) \oplus FI(R_{H,2}, KO_{i,2}, KI_{i,2}) \oplus FI(R_{H,1}, KO_{i,1}, KI_{i,1}) \oplus R_L) \quad \text{(A-5)}$$

In the process shown by the equation (A-5), the value of the equation (A-5), while being partially calculated, is subjected to the XORing operation with LH and LL. This process can be achieved by a processing algorithm described below. FIG. 13 illustrates the processing algorithm in a case where the FL function is assumed to be lacking just under the FO function and the FI function register has 16 bits in the absence of the FO function register. FIG. 13 shows the processing algorithm of the equation (A-5). The processing algorithm shown in FIG. 13 uses a following equation (E-2).

$$R_{H,1} = R_H, R_{H,2} = R_L, R_{H,3} = FI(R_H, KO_{i,1}, KI_{i,1}) \oplus R_L \quad \text{(E-2)}$$

According to the processing algorithm shown in FIG. 13, a partial operation data in the equation (A-4), i.e. (RL∥RL), FI(RH,2, KOi,2, KIi,2)∥FI(RH,2, KOi,2, KIi,2), FI(RH,1, KOi,1, KIi,1)∥FI(RH,1, KOi,1, KIi,1) and 0∥FI(RH,3, KOi,3, KIi,3) are calculated in this order. According to this processing algorithm, each time the calculation of these partial operation data ends, these partial operation data are subjected to the XORing operation with LH∥LL. As a result, this processing algorithm achieves a process requiring no buffering using the FOreg.

The processing algorithm shown in FIG. 13 takes advantage of the fact that the XOR operation in the equation (A-5) can be done by the arithmetic operation equivalent to an equation (A-6) below. Specifically, according to this processing algorithm, tmp1, tmp2, tmp3 and tmp4 indicated in the equation (A-6) are calculated in plural cycles, and each calculation result is subjected to the XORing operation with LH∥LL. According to this processing algorithm, these data values are not required to be buffered, and therefore, the FOreg can be deleted.

However, a similar technique cannot be simply applied to the case of the presence of the FL function described above. If an equation (A-6) is to be applied to the process in the presence of the FL function, a calculation of an equation (A-7) shown below is required.

$$(L_H \| L_L) := (L_H \| L_L) \oplus tmp1 \oplus tmp2 \oplus tmp3 \oplus tmp4$$

$$tmp1 = R_L \| R_L$$

$$tmp2 = FI(R_{H,2}, KO_{i,2}, KI_{i,2}) \| FI(R_{H,2}, KO_{i,2}, KI_{i,2})$$

$$tmp3 = FI(R_{H,1}, KO_{i,1}, KI_{i,1}) \| FI(R_{H,1}, KO_{i,1}, KI_{i,1})$$

$$tmp4 = 0 \| FI(R_{H,3}, KO_{i,3}, KI_{i,3}) \quad \text{(A-6)}$$

$$(L_H \| L_L) := (L_H \| L_L) \oplus FL(tmp1 \oplus tmp2 \oplus tmp3 \oplus tmp4)$$

$$tmp1 = R_L \| R_L$$

$$tmp2 = FI(R_{H,2}, KO_{i,2}, KI_{i,2}) \| FI(R_{H,2}, KO_{i,2}, KI_{i,2})$$

$$tmp3 = FI(R_{H,1}, KO_{i,1}, KI_{i,1}) \| FI(R_{H,1}, KO_{i,1}, KI_{i,1})$$

$$tmp4 = 0 \| FI(R_{H,3}, KO_{i,3}, KI_{i,3}) \quad \text{(A-7)}$$

The data of tmp1, tmp2, tmp3 and tmp4 in the equation (A-7), however, cannot be buffered in the absence of the FOreg. Therefore, the data value expressed by an equation (E-3) below cannot be stored.

$$(tmp1 \oplus tmp2 \oplus tmp3 \oplus tmp4) \quad \text{(E-3)}$$

The result of processing the FL function, i.e. FL(tmp1), FL(tmp2), FL(tmp3) and FL(tmp4) are required to be calculated beforehand in the same cycle as the data of tmp1, tmp2, tmp3 and tmp4 are calculated, respectively. Further, each of the calculation results is required to be subjected the XORing operation with RH∥RL in the same cycle. This process is expressed by an equation (A-8).

$$(L_H \| L_L) := (L_H \| L_L) \oplus FL(tmp1) \oplus FL(tmp2) \oplus FL(tmp3) \oplus FL(tmp4) \quad \text{(A-8)}$$

As compared with the arithmetic operation of the equation (A-7), however, the arithmetic operation of the equation (A-8) causes a problem in respect to logical equivalence. This depends on a following fact. When the result of calculation of the equation (A-8) is identical with that of the equation (A-7), property shown by an equation (A-9) below must be established.

$$FL(tmp1 \oplus tmp2 \oplus tmp3 \oplus tmp4) = FL(tmp1) \oplus FL(tmp2) \oplus FL(tmp3) \oplus FL(tmp4) \quad \text{(A-9)}$$

The equation (A-9) has the property generally called linearity. When the equation (A-9) is established, an equation (A-10) below must be established for arbitrary integers X and Y.

$$FL(X \oplus Y) = FL(X) \oplus FL(Y) \quad \text{(A-10)}$$

It is known that the property shown by the equations (A-9) and (A-10) may not established with regard to the FL function. Therefore, the arithmetic operation indicated by the equation (A-8) may not established.

As disclosed, the known technique still causes the problem that the logical equivalence cannot be maintained in the absence of the 32-bit register for the FO function.

The FL function is known to have no complete linearity expressed by the equation (A-10). As disclosed below, however, we show the fact that the FL function has a partial linearity expressed by an equation (A-11) shown below. In the equation (A-11), a correction constant, i.e. $Ki,2 \lll 1 \| 0$ is used.

$$FL(X \oplus Y) = FL(X) \oplus FL(Y) \oplus ((KL_{i,2} \lll 1) \| 0) \quad \text{(A-11)}$$

The equation (A-11) can be extended with three variables as indicated by an equation (A-12) below. In other words, the FL function has a partial linearity also for the three variables.

$$FL(X \oplus Y \oplus Z) = FL(X \oplus Y) \oplus F(Z) \oplus ((KL_{i,2} \lll 1) \| 0) = $$
$$(FL(X) \oplus FL(Y) \oplus ((KL_{i,2} \lll 1) \| 0)) \oplus F(Z) \oplus $$
$$(((KL_{i,2} \lll 1) \| 0) = FL(X) \oplus FL(Y) \oplus F(Z) \quad \text{(A-12)}$$

By further generalization of the property of the equations (A-11) and (A-12), a following equation (B-1) is established for FL(X) in the case where n is an odd number.

$$FL(X_1 \oplus \ldots \oplus X_n) = FL(X_1) \oplus \ldots \oplus FL(X_n) \quad \text{(B-1)}$$

Also, in the case where n is an even number, an equation (B-2) shown below is established for the FL(X).

$$FL(X_1 \oplus \ldots \oplus X_n) = FL(X_1) \oplus \ldots \oplus FL(X_n) \oplus ((KL_{i,2} \lll 1) \| 0) \quad \text{(B-2)}$$

Note that, when an input to the FL function is expressed as Xk (k=1, 2, . . . , n), an output from the FL function is expressed as FL(Xk).

In the case where the input from the intermediate register to the FL function is the even-numbered one, the FL function performs a correcting operation by subjecting the correction bit string $(KLi,2 \lll 1) \| 0$ to the XOR operation. As a result, the logical equivalence can be maintained. In the equation (B-2), "0" has the length of 16 bits. Thus, the output from the FO function can be input to the FL function dividedly in plural cycles. Consequently, the size of the intermediate register can be 16 bits.

Now, the reason for which the equations (B-1) and (B-2) are established is disclosed I.

Figure 14:
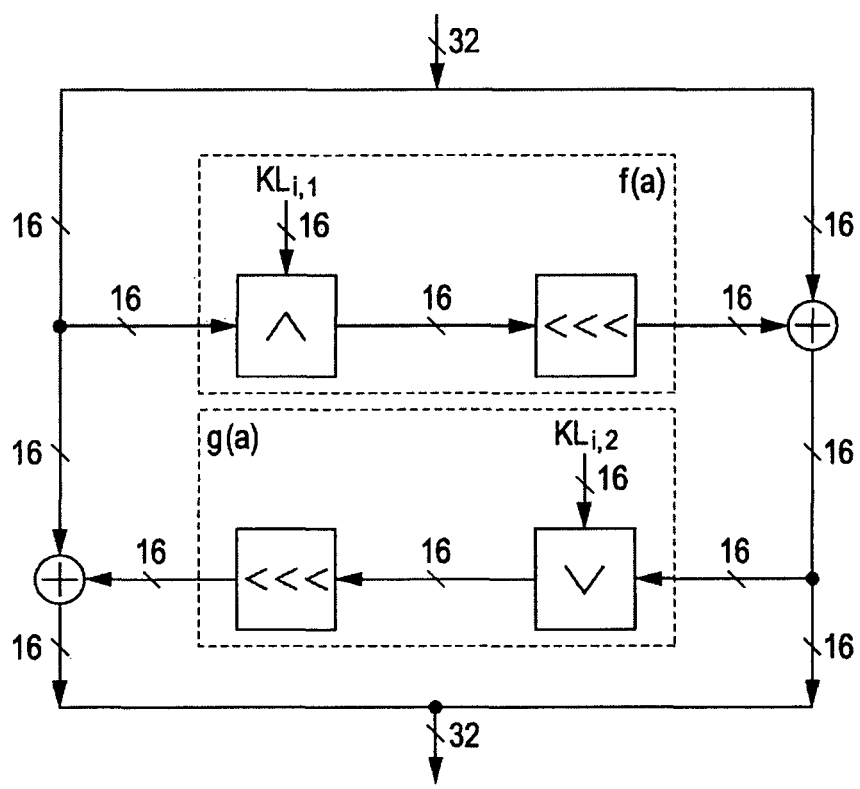
FIG. 14 illustrates partial functions f(a) and g(a) in the FL function.

First, the FL function of KASUMI is explained. FIG. 14 is a circuit diagram showing partial functions f(a) and g(a) in the FL function. In the FL function of KASUMI, the two partial functions f(a) and g(a) are defined as shown in FIG. 14, where "a" is an input to the partial functions. An arithmetic gate symbol "∧" or an arithmetic operator "∩" indicates logical multiplication. Also, an arithmetic gate symbol "∨" or an arithmetic operator "∪" indicates logical addition. An arithmetic gate symbol "$\lll$" indicates a left rotate. Note that the partial functions f(a) and g(a) in the FL function are obtained by an equation (B-3) below.

$$f(a) = (a \cap KL_{i,1}) \lll 1$$

$$g(a) = (a \cup KL_{i,2}) \lll 1 \quad \text{(B-3)}$$

Here, an equation (B-4) below is taken into consideration.

$$x \cup y = xy \oplus x \oplus y \quad \text{(B-4)}$$

Then, f(a) and g(a) in the equation (B-3) can be expressed as an equation (B-5) below using an AND-XOR form.

$$f(a) = (a \cap KL_{i,1}) \lll 1$$

$$g(a) = (a \cap KL_{i,2} \oplus a \oplus KL_{i,2}) <<< 1 \quad (B-5)$$

Based on property expressed by the equation (B-5), Lemma1 and Lemma2 described below are established for f( ), g( ) and arbitrary integers x, y and z.

Lemma1

An equation (B-6) below is established for an arbitrary even number of variables in addition to the two variables x and y.

$$f(x \oplus y) = f(x) \oplus f(y)$$

$$g(x \oplus y) = g(x) \oplus g(y) \oplus (KL_{i,2} <<< 1) \quad (B-6)$$

Lemma2

An equation (B-7) below established for an arbitrary odd number of variables in addition to the three variables x, y and z.

$$f(x \oplus y \oplus z) = f(x) \oplus f(y) \oplus f(z)$$

$$g(x \oplus y \oplus z) = g(x) \oplus g(y) \oplus g(z) \quad (B-7)$$

With respect to f( ), Lemma1 and Lemma2 will be verified below.

$$f(x) = (x \cap KL_{i,1}) <<< 1$$

$$f(y) = (y \cap KL_{i,1}) <<< 1 \quad (B-8)$$

From an equation (B-8), an equation (B-9) below is established.

$$f(x \oplus y) = ((x \oplus y) \cap KL_{i,1}) <<< 1 = f(x) \oplus f(y) \quad (B-9)$$

$$f(x \oplus y) = f(x) \oplus f(y) \quad (B-10)$$

When an equation (B-10) with two variables is established, a similar equation is also established for an arbitrary number of variables. This is by reason of the fact that the equation (B-10) can be extended to three variables as an equation (B-11) below.

$$f(x \oplus y \oplus z) = f(x \oplus (y \oplus z)) = f(x) \oplus f(y \oplus z) = f(x) \oplus f(y) \oplus f(z) \quad (B-11)$$

Also, by repeating modifications for an equation similar to the equation (B-11), variables can be increased to an arbitrary number.

With respect to g( ), Lemma1 and Lemma2 will be verified below.

$$g(x) = (x \cap KL_{i,2} \oplus x \oplus KL_{i,2}) <<< 1$$

$$g(y) = (y \cap KL_{i,2} \oplus y \oplus KL_{i,2}) <<< 1$$

$$g(z) = (z \cap KL_{i,2} \oplus z \oplus KL_{i,2}) <<< 1 \quad (B-12)$$

From an equation (B-12), equations (B-13) and (B-14) shown below are established.

$$g(x \oplus y) = ((x \oplus y) \cap KL_{i,2} \oplus x \oplus y \oplus KL_{i,2}) <<< 1 = \\ (((x \oplus y) \cap KL_{i,2} \oplus x \oplus y \oplus KL_{i,2} \oplus KL_{i,2}) <<< 1) \oplus \\ (KL_{i,2} <<< 1) = g(x) \oplus g(y) \oplus (KL_{i,2} <<< 1) \quad (B-13)$$

$$g(x \oplus y \oplus z) = ((x \oplus y \oplus z) \cap KL_{i,2} \oplus x \oplus y \oplus z \oplus KL_{i,2}) <<< 1 = \\ (((x \oplus y \oplus z) \cap KL_{i,2} \oplus x \oplus y \oplus z \oplus KL_{i,2} \oplus KL_{i,2} \\ \oplus KL_{i,2}) <<< 1) = g(x) \oplus g(y) \oplus g(z) \quad (B-14)$$

In a case of even numbers of variables as shown in the equation (B-13), a correction constant $(KL_{i,2} <<< 1)$ is required. In a case of an odd number of variables as shown in the equation (B-14), on the other hand, the correction constant is not required.

A linearity of the FL function as a whole will be explained below.

Figure 15:
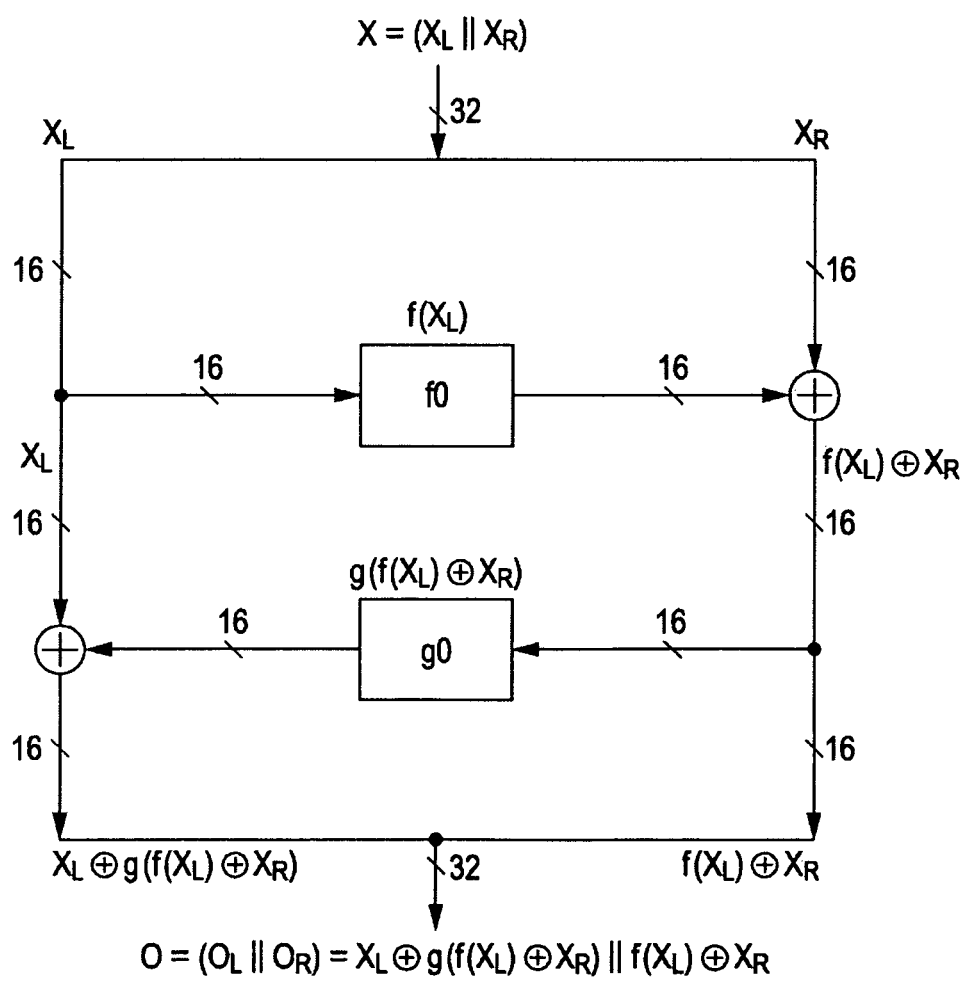
FIG. 15 illustrates a linearity of the entire FL function.

FIG. 15 is a circuit diagram showing the linearity of the FL function as a whole. The circuit shown in FIG. 15 is identical with the circuit shown in FIG. 14. In this circuit, the FL function is expressed as FL( ). Also, an input to the FL function is defined as $X = (XL \| XR)$. Further, an output from the FL function is defined as $O = (OL \| OR)$. The input/output of the FL function is expressed as $O = FL(X)$ using O and X, where X and O are each 32 bits, and XL, XR, OL and OR are each 16 bits. In the process, OL and OR can be expressed as the function of XL and XR, respectively, and an equation (C-1) below is established.

$$O_L = X_L \oplus g(f(X_L) \oplus X_R)$$

$$O_R = f(X_L) \oplus X_R \quad (C-1)$$

Taking the complete linearity of f( ) into consideration, it is apparent that the linearity is established for OR. The problem remaining to be solved is whether or not the linearity can be established for OL. In view of the fact that the g( ) has the linearity for odd numbers of variables as described above, the FL is a linear function only for odd numbers of variables. In other words, an equation (C-2) below is established only in the case where n is an odd number.

$$FL(X_1 \oplus \ldots \oplus X_n) = FL(X_1) \oplus \ldots \oplus FL(X_n) \quad (C-2)$$

In the case where n is an even number, on the other hand, an equation (C-3) below is established.

$$FL(X_1 \oplus \ldots \oplus X_n) = FL(X_1) \oplus \ldots \oplus FL(X_n) \\ \oplus ((KL_{i,2} <<< 1) \| 0) \quad (C-3)$$

This is by reason of the fact that an equation (C-5) is established when an equation (C-4) is established. Note that QR is not explained because it is apparently linear.

$$P = FL(Y),$$

$$Y = (Y_L \| Y_R),$$

$$P = (P_L \| P_R),$$

$$Q = FL(Z),$$

$$Q = (Q_L \| Q_R),$$

$$Z = X \oplus Y = (X_L \oplus Y_L \| X_R \oplus Y_R) \quad (C-4)$$

$$O_L = X_L \oplus g(f(X_L) \oplus X_R) \quad (C-5)$$
$$P_L = Y_L \oplus g(f(Y_L) \oplus Y_R)$$

$$Q_L = (X_L \oplus Y_L) \oplus g(f(X_L \oplus Y_L) \oplus X_R \oplus Y_R)$$
$$= (X_L) \oplus (Y_L) \oplus g((f(X_L) \oplus X_R) \oplus (f(Y_L) \oplus Y_R))$$
$$= (X_L) \oplus (Y_L) \oplus g(f(X_L) \oplus X_R) \oplus g(f(Y_L) \oplus Y_R) \oplus$$
$$(KL_{i,2} << 1)$$
$$= O_L \oplus P_L \oplus (KL_{i,2} << 1)$$

The linearity using the correction by the constant $(KL_i, 2 <<< 1)$ is established only for QL, i.e. the left 16 bits of the output. Also, the linearity is always established for QR. In the case where n is an even number, therefore, an equation (C-6) below is established.

$$FL(X_1 \oplus \ldots \oplus X_n) = FL(X_1) \oplus \ldots \oplus FL(X_n) \\ \oplus ((KL_{i,2} <<< 1) \| 0) \quad (C-6)$$

Finally, the relational expressions (B-1) and (B-2) described above are obtained.

With regard to the round processing unit of KASUMI, an embodiment of the processing algorithm that can be implemented as hardware only with the 16-bit size of the intermediate register FIreg and the hardware will be explained below.

FIG. 16 illustrates a processing algorithm of an odd-numbered round in the round processing unit according to a first embodiment. In the process of an odd-numbered round (second case), the FL function and the FO function are executed in this order.

FIreg indicates a 16-bit intermediate register. The FI function is processed with two cycles. FI'i,j( ) designates the intermediate result of the first cycle. FIsig designates a signal line. "FIreg<=" indicates that a value on the right side is substituted into FIreg in the next cycle (non-blocking substitution). "FIsig=" indicates that a value on the right side is substituted into the signal line in the present cycle (blocking substitution).

In the first, third and fourth cycles, an output from the FL function is used in the same cycle.

FIG. 17 illustrates a processing algorithm for an even-numbered round in the round processing unit according to a first exemplary embodiment. In the process of an even-numbered round (first case), the FO function and the FL function are executed in this order.

Since an input to the FL function is done in odd numbers of times (three times) in this embodiment, no correcting operation is required. The input to the FL function is done in the third, fifth and seventh cycles.

In the odd-numbered round, the data register is conventionally subjected to the XOR operation in the second, fourth and sixth cycles. In the even-numbered round, on the other hand, the XOR operation is executed in the third, fifth and seventh cycles. In other words, executed is a control for delaying a process one cycle later. Since the signal is connected in the same cycle from the FL function to the FO function in the odd-numbered round, the register is inserted in the data path from the FO function to the FL function in the even-numbered round.

By inserting and controlling the register in the data path from the FO function to the FL function above, only one FL function may be implemented, and therefore, the circuit size can be reduced. In the case where a process is executed also in even-numbered rounds at a timing similar to odd-numbered rounds without delaying one cycle as described above, two FL functions would be required to be implemented, so that a circuit size would increase. Assuming that one FL function may be implemented in such a case, a feedback structure of a combined circuit would be formed, so that a hardware with difficulty on its production in view of reliability.

Figure 18:
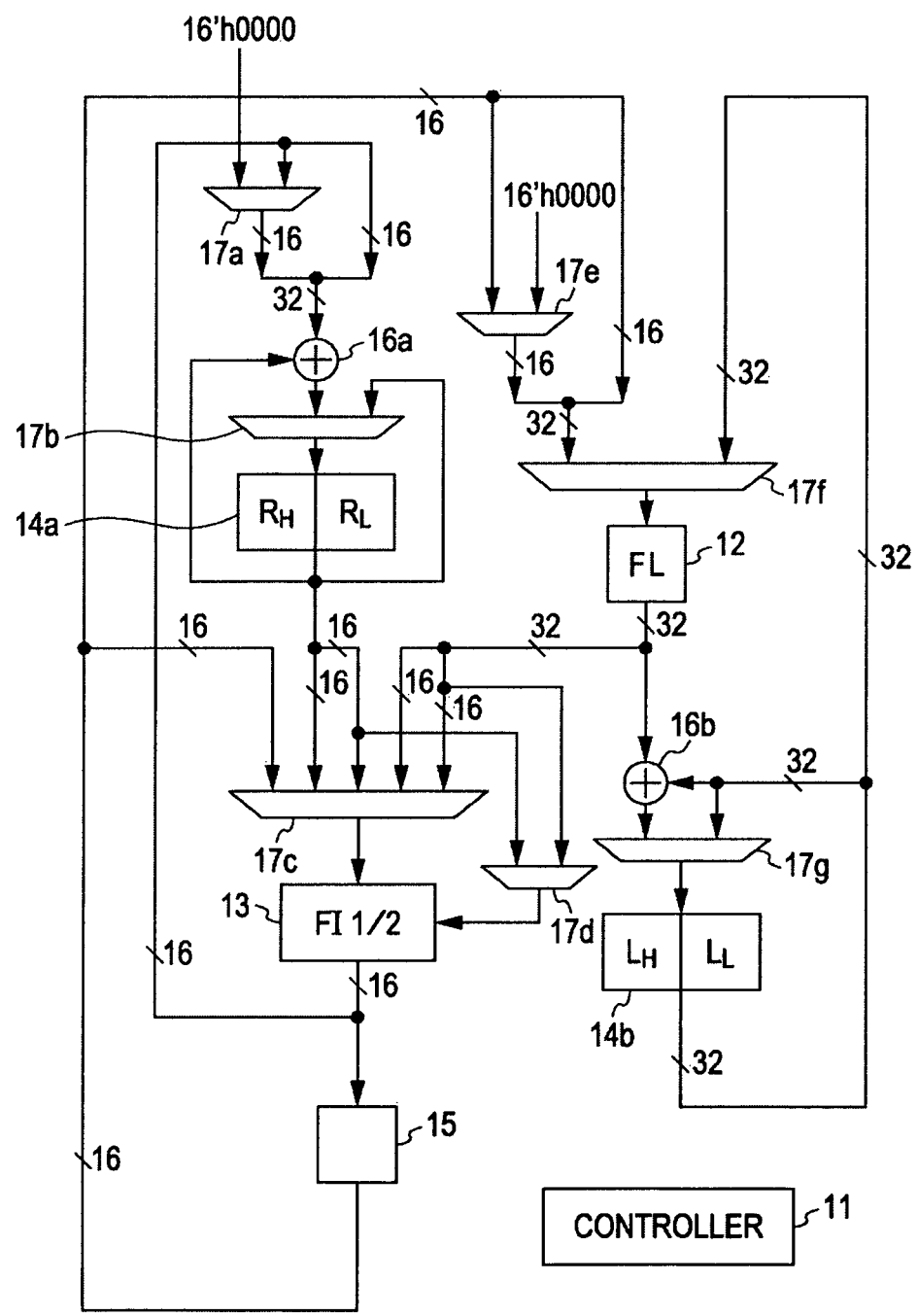
FIG. 18 is a circuit diagram showing an example of the round processing unit according to a first exemplary embodiment.

FIG. 18 illustrates round processing unit according to a first exemplary embodiment. This round processing unit includes a controller 11, a FL function 12 (FL function operating unit), a FI ½ module 13 (partial function operating unit), data registers 14a and 14b, an intermediate register 15, XOR gates 16a and 16b, and selectors 17a, 17b, 17c, 17d, 17e, 17f and 17g. The data register 14a has 32 bits of which its high-order 16 bits correspond to RH and its low-order 16 bits correspond to RL. The data register 14b has 32 bits of which its high-order 16 bits correspond to LH and its low-order 16 bits correspond to LL. The intermediate register 15 has 16 bits and corresponds to FIreg. The controller 11 controls the selectors 17a, 17b, 17c, 17d, 17e, 17f and 17g in accordance with the processing algorithm of the embodiment described above. "16'h0000" indicates 16-bit zeros.

According to this embodiment, the 32-bit intermediate register for the FO function in the conventional round processing unit can be eliminated.

In the round processing unit of KASUMI according to this embodiment, the processing algorithm for the odd-numbered rounds is similar to that of a first exemplary embodiment.

FIG. 19 illustrates a processing algorithm for an even-numbered round in a round processing unit according to a second embodiment. Since an input to the FL function is done in even numbers of times (four times) in this embodiment, a correcting operation is performed in the fourth cycle. The input to the FL function is done in the third, fifth and seventh cycles. According to this embodiment, the correcting operation is done in the fourth cycle. Also, the data register {LH∥LL} is subjected to the XOR operation in the sixth cycle with the output data from FL function to which RL is input. These two processes may be done in any of the first, second, fourth and sixth cycles. In other words, these two processes may be done at any time other than in the third, fifth and seventh cycles in which the XORing operation is done for the data register.

Figure 20:
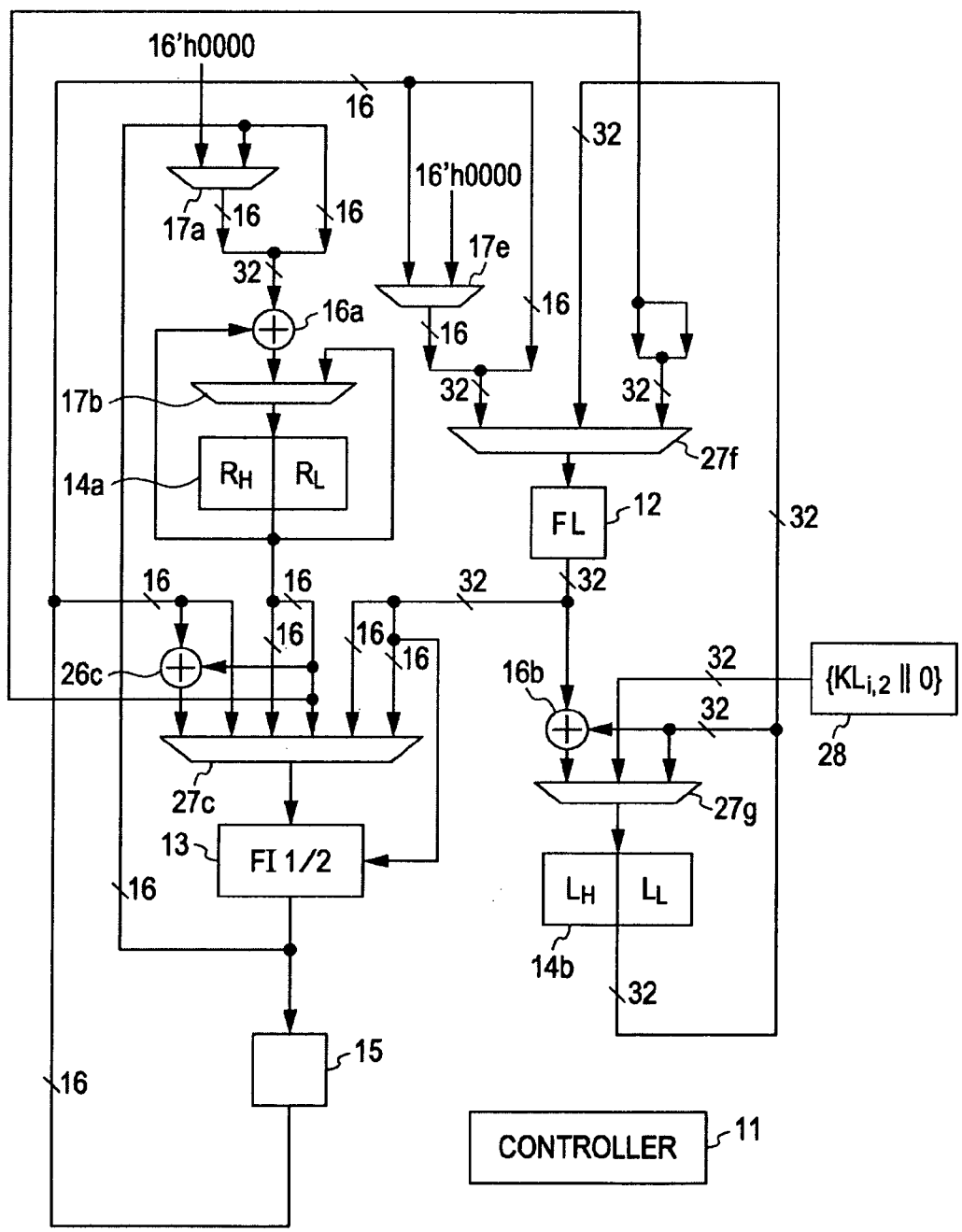
FIG. 20 is a circuit diagram showing an example of the round processing unit according to a second exemplary embodiment.

FIG. 20 an exemplary round processing unit according to a second embodiment. In FIG. 20, the same reference numerals as those in FIG. 18 designate the same or equivalent components as those shown in FIG. 18 and further detailed explanation is omitted. As compared with a first exemplary embodiment, the round processing unit of this embodiment has a controller 21 in place of the controller 11, selectors 27c, 27f and 27g in place of the selectors 17c, 17f and 17g, and as newly added parts, an XOR gate 26c and a correcting operation unit 28. The controller 21 controls the selectors 17a, 17b, 17e, 27c, 27f and 27g in accordance with the processing algorithm of this embodiment described above.

As compared with a conventional circuit, the size of the intermediate register of this embodiment is only 16 bits. This implement may be made possible by correcting operation unit 28 corresponding to the correcting operation in the equation (B-2).

According to an exemplary embodiment of a disclosed cipher processing apparatus, the intermediate register for storing the result of the arithmetic operation of the FO function may be eliminated in the operation of the FO and FI functions.

FIG. 21 illustrates the size of the intermediate register and the circuit size of the round processing unit. FIG. 21 illustrates the size of all the intermediate registers and the circuit size of the intermediate register according to both the prior art and a second exemplary embodiment.

As compared with conventional systems, a second exemplary embodiment can reduce the size of the intermediate register from 48 bits to 16 bits. This results in the 67% reduction in the circuit size of the intermediate register.

In consideration of the circuit size of a very compact KASUMI hardware (about 3400 gates with the process of 0.13 μm), the circuit size of the KASUMI hardware with the conventional round processing unit is estimated to have about 3650 gates. By applying a second exemplary embodiment to the conventional hardware, it is expected to achieve the effect of reducing the circuit size by about 12%.

In the KASUMI hardware with the conventional round processing unit, one cipher/decipher session requires 56 cycles. The KASUMI hardware with the round processing unit according to a second exemplary embodiment, on the other hand, requires 52 cycles for one cipher/decipher session. The operating frequency being the same, therefore, a second exemplary embodiment is increased in speed by about 7% as compared with conventional approaches.

In an exemplary embodiment disclosed, N is 16. The first, second and third extension keys may correspond to KLi, KOi, KIi, respectively.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A cipher processing apparatus for arithmetic operations of an FO function and an FL function in a cipher process, comprising:
   a first circuitry configured to generate a 2N-bit output by an arithmetic operation of the FL function based on a 2N-bit input and a first extension key;
   a second circuitry configured to generate an N-bit output by an arithmetic operation of a partial function of an FI function based on an N-bit input and second and third extension keys;
   an N-bit intermediate register configured to store an output of the second circuitry;
   a 2N-bit first data register configured to store data based on the output of the first circuitry;
   a controller configured to make the second circuitry perform six cycles of the arithmetic operation of the partial function, inputting an output of the N-bit intermediate register to the first circuitry, and storing the data based on the output of the first circuitry in the 2N-bit first data register, in a first case in which the FL function uses a result of an arithmetic operation of the FO function; and
   a third circuitry configured to generate a correction bit string of 2N bits based on the first extension key,
   wherein the controller makes the first circuitry perform the arithmetic operation of the FL function even numbers of times, executes an XOR operation between the correction bit string generated by the third circuitry and the output of the first circuitry, and stores a result of the XOR operation in the first data register, in the first case,
   wherein N is a number greater than 0.

2. The cipher processing apparatus according to claim 1, further comprising a 2N-bit second data register capable of storing data based on the output of the second circuitry,
   wherein the controller makes the first circuitry perform an arithmetic operation of the FL function, inputs an output of the first circuitry to the second circuitry, makes the second circuitry perform six cycles of the arithmetic operation of the partial function, and stores the data based on the output of the second circuitry in the second data register, in a second case in which the FO function uses an arithmetic operation result of the FL function.

3. The cipher processing apparatus according to claim 1, wherein the controller makes the first circuitry perform the arithmetic operation of the FL function an odd number of times in the first case.

4. The cipher processing apparatus according to claim 1, wherein the third circuitry executes a left rotate by one bit on an N bits in the first extension key to set the N bits to high-order N bits of the correction bit string and to set 0 of N bits to low-order N bits of the correction bit string.

5. The cipher processing apparatus according to claim 1, wherein the first data register stores data resulting from the accumulation of the output of the first circuitry using an XOR operation.

6. The cipher processing apparatus according to claim 2, wherein the second data register stores data resulting from the accumulation of 2N bits using an XOR operation, in which the output of the second circuitry is set to at least the N high-order bits or the N low-order bits.

7. The cipher processing apparatus according to claim 2, wherein the controller executes a round process of KASUMI using the first circuitry, the second circuitry, the intermediate register, the first data register and the second data register,
   the first case corresponds to even-numbered rounds of the round process, and
   the second case corresponds to odd-numbered rounds of the round process.

8. The cipher processing apparatus according to claim 1, wherein two cycles of the arithmetic operation of the partial function is the arithmetic operation of the FI function.

9. The cipher processing apparatus according to claim 1, wherein N is 16.

10. A cipher processing method for arithmetic operations of an FO function and an FL function in a cipher process, comprising:
    generating a 2N-bit output using an arithmetic operation of the FL function based on a 2N-bit input and a first extension key by a first circuitry;
    generating an N-bit output using an arithmetic operation of a partial function of an FI function based on an N-bit input and second and third extension keys by a second circuitry;
    storing an output of the second circuitry in an N-bit intermediate register;
    storing data based on the output of the first circuitry in a 2N-bit first data register;
    making the second circuitry perform six cycles of the arithmetic operation of the partial function, inputting an output of the N-bit intermediate register to the first circuitry, and storing the data based on the output of the first circuitry in the 2N-bit first data register, by a controller, in a first case in which the FL function uses a result of an arithmetic operation of the FO function;

generating a correction bit string of 2N bits based on the first extension key;

making the first circuitry perform the arithmetic operation of the FL function even numbers of times;

executing an XOR operation between the correction bit string generated by a third circuitry and the output of the first circuitry; and storing a result of the XOR operation in the first data register, in the first case, wherein N is a number greater than 0.

11. The cipher processing method according to claim 10, further comprising:

storing data based on the output of the second circuitry in a 2N-bit second data register, making the first circuitry perform an arithmetic operation of the FL function, inputting an output of the first circuitry to the second circuitry, making the second circuitry to perform six cycles of arithmetic operation of the partial function, and storing the data based on the output of the second circuitry in the second data register, in a second case in which the FO function uses an arithmetic operation result of the FL function.

12. The cipher processing method according to claim 10, making the first circuitry perform the arithmetic operation of the FL function an odd number of times in the first case.

13. The cipher processing method according to claim 10, executing a left rotate by one bit on an N bits in the first extension key to set the N bits to high-order N bits of the correction bit string and to set 0 of N bits to low-order N bits of the correction bit string.

14. The cipher processing method according to claim 10, wherein the first data register stores data accumulated using an XOR operation with the output of the first circuitry.

15. The cipher processing method according to claim 11, storing data resulting from accumulation of 2N bits in the second data register, in which the output of the second circuitry is set to at least the N high-order bits or the N low-order bits.

16. The cipher processing method according to claim 11, executing a round process of KASUMI using the first circuitry, the second circuitry, the intermediate register, the first data register and the second data register, wherein the first case corresponds to even-numbered rounds of the round process, and the second case corresponds to odd-numbered rounds of the round process.

17. The cipher processing method according to claim 10, wherein two cycles of the arithmetic operation of the partial function is the arithmetic operation of the FI function.

18. The cipher processing method according to claim 10, wherein N is 16.

19. The cipher processing apparatus according to claim 1, wherein the second circuitry includes a logical multiplication circuit that executes logical multiplication, and a left rotation circuit that executes a left rotate.

* * * * *